United States Patent
Wingerath

(10) Patent No.: US 6,192,421 B1
(45) Date of Patent: Feb. 20, 2001

(54) PROGRAM-CONTROLLED DEVICE WITH RELOADING POSSIBILITY FOR AND CHANGEOVER POSSIBILITY TO A SECOND OPERATING SYSTEM WITHOUT PROGRAM INTERRUPTION BY EXCHANGING TWO ADDRESS LINES EACH OTHER

(75) Inventor: Norbert Wingerath, Schwieberdingen (DE)

(73) Assignee: Alcatel, Paris (FR)

(*) Notice: Under 35 U.S.C. 154(b), the term of this patent shall be extended for 0 days.

(21) Appl. No.: 09/078,908

(22) Filed: May 14, 1998

(30) Foreign Application Priority Data

May 20, 1997 (DE) ............................................. 197 20 990

(51) Int. Cl.[7] ..................................................... G06F 9/445
(52) U.S. Cl. .......................... 710/14; 710/131; 709/108; 711/173; 713/100
(58) Field of Search ................................... 709/108, 107; 711/173, 202; 717/11; 713/100; 710/3, 14, 131

(56) References Cited

U.S. PATENT DOCUMENTS 4,626,986 * 12/1986 Mori ..................................... 713/100
5,127,096 * 6/1992 Kaneko et al. ...................... 711/202
5,452,339   9/1995 Siu ......................................... 379/27
5,581,457 * 12/1996 Tsukahara ............................ 364/131

FOREIGN PATENT DOCUMENTS 0196661   10/1986 (EP) .
0321694    6/1989 (EP) .
0393281   10/1990 (EP) .
62-217326 *  9/1987 (JP) .
4-175924  *  6/1992 (JP) .

OTHER PUBLICATIONS

Official Gazette of Sep. 19, 1995, p. 1944.

* cited by examiner

*Primary Examiner*—Thomas C. Lee
*Assistant Examiner*—Ilwoo Park
(74) *Attorney, Agent, or Firm*—Ware, Fressola, Van Der Sluys & Adolphson LLP

(57) ABSTRACT

The invention concerns a program-controlled device with reloading possibility for and change-over possibility to a second operating system (GLS1, GLS2, GLS3, GLSx) without program interruption, with a processor and a program memory which the processor can address via address lines, where a switchable change-over switch is provided in the address lines whereby two memory areas (01xx, 10xx) can be exchanged with each other by means of translation.

2 Claims, 2 Drawing Sheets

PROGRAM-CONTROLLED DEVICE WITH RELOADING POSSIBILITY FOR AND CHANGEOVER POSSIBILITY TO A SECOND OPERATING SYSTEM WITHOUT PROGRAM INTERRUPTION BY EXCHANGING TWO ADDRESS LINES EACH OTHER

TECHNICAL FIELD

The invention concerns a program-controlled device with reloading possibility for and change-over possibility to a second operating system without program interruption.

BACKGROUND OF THE INVENTION

Such devices are widely used. Reference to U.S. Pat. No. 5,452,339 is only made as an example in this case. It describes a course which ensures that no problems result from a defective change-over. The change-over possibility is stipulated in that case.

If a program-controlled device must be available practically without any interruption and still be able to be switched over to another operating system, it must be possible to reload the second program version during the operation and then switch over to it.

Processors which have an integrated solution for this problem can be found in the market. They also have other advantageous properties and are therefore respectively expensive. However, these other advantageous properties are not needed in every instance and the higher price is therefore not justified. The reloading of the new operating system into a still available memory area with its own address, and the subsequent change-over by considering this individual address are not feasible in practice, because a restart is never fully connected and different addresses cannot be taken into consideration during a restart. In contrast, the use of two switchable parallel memory blocks with the same addresses results in that the respectively inactive memory block cannot be addressed by the same processor and thus the reloading of the new operating system only becomes possible to a limited degree.

SUMMARY OF THE INVENTION

The object of the invention is to present a cost-effective solution for the cited problem.

The invention achieves this object via a program-controlled device with reloading possibility for and change-over possibility to a second operating system without program interruption, with a processor and a program memory which the processor can address via address lines, wherein a switchable change-over switch is provided in the address lines, whereby two memory areas can be exchanged with each other by means of translation.

It utilizes two separate memory areas, whose addresses can be exchanged with each other by means of change-over switches.

BRIEF DESCRIPTION OF THE DRAWINGS

The invention is explained further in the following with the aid of the two attached drawings, wherein.

BEST MODE FOR CARRYING OUT THE INVENTION

Figure 1:
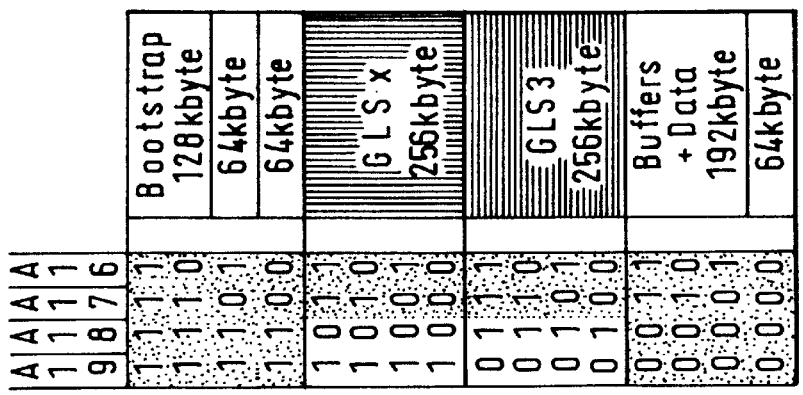
FIG. 1 illustrates the organization of the data memory of a device according to the invention.
Figure 1:
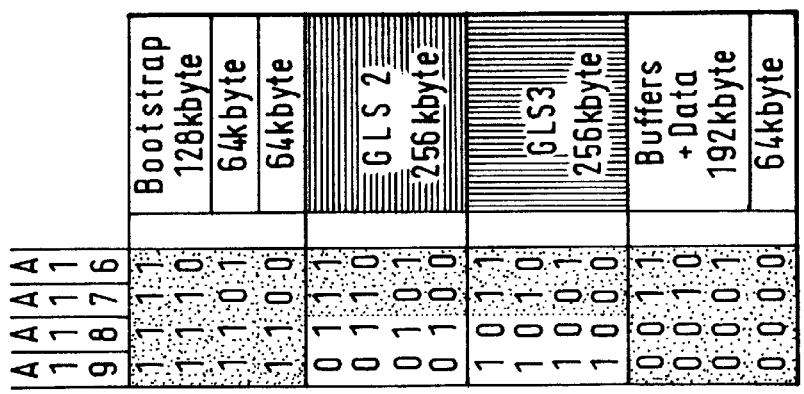
Figure 1:
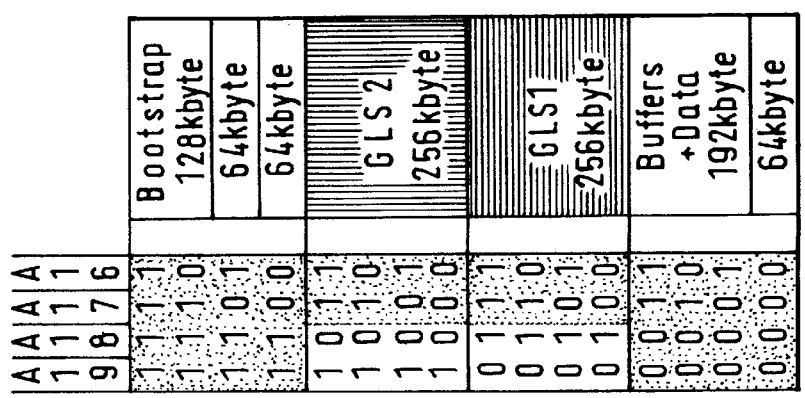

The organization of the data memory of a program-controlled device according to the invention is first explained by means of FIG. 1, and thus the basic idea of the invention. From left to right FIG. 1 illustrates three successive operating situations, each of which uses a different version of the operating system. The transition arrows shown underneath are twisted around and represent an exchange which is taking place.

Each of the three adjacent illustrations shows the four address bits with the highest value on the left side, and the memory structure on the right. Only the part of the memory which contains the operating system is shown, as well as the pertinent part of the address area.

The memory is divided into four areas of equal size, each of which comprises 256 kbytes, and their highest value bits, namely the address bits A18 and A19, assume the values of 00, 01, 10 and 11. The lowermost and the uppermost of these four memory areas are further divided into blocks of 64 kbytes each, which in turn are partly condensed into blocks of 128 kbytes and 192 kbytes. The block illustrated uppermost is designated "bootstrap" and contains the part of the program which is needed to start it. Another block is designated "buffers+data". It is provided as a temporary storage for applicable data. Three further blocks contain only an indication of their size and no indication about the purpose of their utilization. These blocks cited so far are not acquired by the present invention, but the existence of such further blocks is taken into consideration.

To the contrary, the present invention acquires the two large central blocks which comprise 256 kbytes each and carry a designation for a GLS operating system used in the example, followed by a version number, thus GLS1, GLS2, GLS3 and GLSx.

Some parts of the address bits have a grey (spotted) background and others do not. The part with the grey background basically remains unchanged while the part without background changes in accordance with the invention.

Due to the change-over of address lines according to the invention, the processor always uses the same addresses, while different addresses are stored in the memory. The illustration in FIG. 1 graphically depicts the arrangement in the memory, while the entered address bits cause the processor to indicate the addressing.

The operating system GLS1 is used first. It is stored in the particular memory area which carries the two address bits 01 with the highest value, and is also reached by the processor with these address bits. During the operation of this operating system GLS1, it is possible to load the next operating system GLS2 into the memory area with the two address bits 10 of the highest value. Although the operating system GLS2 is reached from the operating system GLS1, it is not interpreted as an operating system because the processor cannot reach it with the addresses provided to that end. The illustration in FIG. 1 shows the designation for the respective active operating system in bold; it has a horizontally lined background. The corresponding inactive operating system has a vertically lined background with a normal designation.

If a change-over is now to take place from operating system GLS1 to operating system GLS2, the appropriate address lines for the address bits A18 and A19 are exchanged with each other. This achieves that the processor, by means of the same addresses, reaches that memory area in which the operating system GLS2 is stored. This makes the operating system GLS2 active and takes the operating system GLS1 out of operation. The same method can of course be used to switch back to the operating system GLS1. The transfer to an operating system GLS3 and any other operating system GLSX is illustrated in the same manner.

With the described type of change-over, the address lines for the upper and the lower memory area are interchanged. But since these address lines are equal to each other, namely either two times "0" or two times "1", the exchange changes nothing in these memory areas.

Two successive address lines can be exchanged with each other in the depicted case. The lower value of the two address lines, A18 in this case, corresponds to the size of each of the two memory areas being interchanged, in this case 2 to the power of 18 equals 262144, corresponding to 256 kbytes.

The change-over could also take place in a different manner, for example by translation with a table stored in a ROM or PROM. For example the address lines A16–A19 coming from the processor could be entered to four address inputs of this translator, and via four data output lines of this translator each of the possible combinations of input addresses can be assigned to an address to be stored in the memory. In that case the change-over would take place with a change-over signal which is entered to another address input of the translator. Such a change-over by means of translation would not only have the advantage that finer steps could be made in the size of the memory areas to be switched over, but the additional possibility of switching between more than two operating systems could be created. This would require entering a change-over signal with more than one bit in more than one other address input.

It must of course be ensured that the change-over results in a defined condition. It is not possible to simply jump from any area in an operating system to that area of the other operating system which happens to have the same address. In the simplest of cases the change-over is linked to a restart. However this restart can take place without any program interruption, immediately after the preceding program is terminated.

The question of how the change-over is triggered is of secondary significance in this case. Program-controlled, manual or event-controlled change-overs are a possibility for example. The following describes an example for the program-controlled change-over. A manual change-over could take place for example by means of a click-stop switch which triggers a soft reset via a monoflop in each of the two positions. An event-controlled change-over could be a remote change-over for example.

Figure 2:
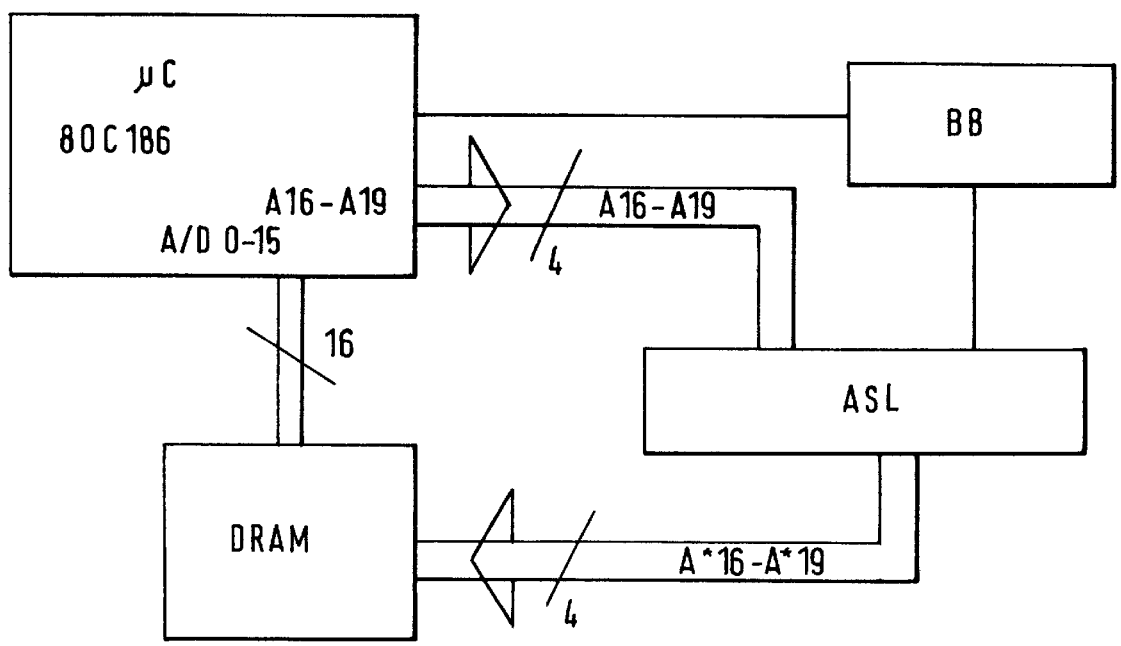
FIG. 2 illustrates an embodiment of a device according to the invention.

A device of the invention that is suitable for a program-controlled change-over will be described with the aid of FIG. 2. The device in FIG. 2 has a processor $\mu C$, a program memory DRAM, an address-switch-logic ASL and a one-bit memory BB for controlling the address-switch-logic ASL.

The processor $\mu C$ (indicated for example as type 80C186 in this instance) is directly connected to the program memory DRAM via a 16 bit wide combined address and data bus A/D 0–15, and indirectly via a 4 bit wide, pure address bus A16–A19 through the address-switch-logic ASL to the program memory DRAM. The address lines A18 and A19 can be exchanged with each other in the address-switch-logic ASL. The address lines A16 and A17 are not affected in this example. Whether or not the address-switch-logic ASL exchanges the address lines A18 and A19 with each other depends on the output of the one-bit memory BB, which in turn can be deliberately set by the processor $\mu C$.

Depending on whether or not the one-bit memory BB loses its contents during a voltage interruption, this change-over possibility can either be used only for change-overs during operation, or for permanent change-overs as well. If no permanent storage is required, a two-bit memory can also be used instead of the one-bit memory BB, and a translating logic as described earlier can be used as the address-switch-logic, where a basic operating system is always activated during a voltage interruption, from where the change-over to one of two or three others can then take place.

The professional is aware of enough variations to configure the cited components and the possible modifications of the described example.

The present description has essentially always addressed the operating system. But the description also makes it clear that every program or program part can be addressed here in the manner of the invention. In this case a very direct type of addressing takes place, whereby a certain program part can also be reached by the processor at the same address, even with different program versions.

What is claimed is:

1. A program-controlled device with reloading possibility for and change-over possibility to a second operating system (GLS1, GLS2, GLS3, GLSX) without program interruption, with a processor ($\mu C$) and a program memory (DRAM) which the processor can address via address lines (A/D0–15, A16–A19), characterized in that a switchable change-over switch (ASL) is provided in the address lines, whereby two memory areas (01xx, 10xx) can be exchanged with each other by means of translation, wherein the switchable change-over switch exchanges two address lines (A19, A18) with each other.

2. A program-controlled device as claimed in claim 1, characterized in that the two address lines that can be exchanged with each other are intended for sequential value address bits, and that the lower value address bit has a value which is equal to the size of each of the two memory areas being exchanged.

\* \* \* \* \*

UNITED STATES PATENT AND TRADEMARK OFFICE
CERTIFICATE OF CORRECTION

PATENT NO. : 6,192,421 B1  Page 1 of 1
DATED : February 20, 2001
INVENTOR(S) : Wingerath It is certified that error appears in the above-identified patent and that said Letters Patent is hereby corrected as shown below:

Column 4, claim 1,
Line 37, "GLSX" should be -- GLSx --.

Signed and Sealed this

Twenty-fifth Day of December, 2001

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,192,421 B1  Page 1 of 1
DATED : February 20, 2001
INVENTOR(S) : Wingerath It is certified that error appears in the above-identified patent and that said Letters Patent is hereby corrected as shown below:

<u>Title page,</u>
References Cited, add two U.S Patent Documents namely:

5,155,837    10/13/92    Liu et al.    395/500
    5,257,380    10/26/93    Lang        395/700

<u>Column 4,</u>
Line 37, "GLSX" should be -- GLSx --.

Signed and Sealed this

Sixteenth Day of April, 2002

Attest:

JAMES E. ROGAN
*Director of the United States Patent and Trademark Office*

*Attesting Officer*